July 14, 1970 L. A. R. BOUCHETAL DE LA ROCHE 3,520,240
CAMERA SHUTTER

Filed Nov. 9, 1967 2 Sheets-Sheet 1

United States Patent Office 3,520,240
Patented July 14, 1970

3,520,240
CAMERA SHUTTER
Lucien Antoine Regis Bouchetal de la Roche, Lyon,
France (Lieudit Meginant, 69 Tassin-la-Demi-Lune,
France)
Filed Nov. 9, 1967, Ser. No. 681,797
Claims priority, application France, Jan. 17, 1967,
48,168
Int. Cl. G03b 9/26
U.S. Cl. 95—60      5 Claims

ABSTRACT OF THE DISCLOSURE

A camera shutter assembly is constituted by a shutter of molded plastic material with which an actuating spring in the shape of a spring strip is integral, and a counter-shutter. The counter-shutter is pivotably mounted on a casing of the camera and molded integrally with a return spring strip and with an extension adapted to be used as a releasing key. The two spring strips are secured to the shutter and the counter-shutter, respectively, at locations opposite to the respective pivots of the latter. The counter-shutter has an eccentric pin thereon which is received in an elongated slot in the shutter. The shutter is moved when the key is actuated to release a notch surface from a fixed abutment on the casing. Whereupon the shutter undergoes movement under the action of its blade to open and close the lens aperture.

---

The present invention relates to a camera shutter of a very simplified construction, particularly suitable for low cost cameras such as those which are discarded after they are used and the film they contain is exposed.

The shutter of the invention is constructed in accordance with features peculiar to certain thermoplastic materials, as well as a mechanical design enabling said shutter to be reduced to two component parts only, to wit, the shutter proper, which is molded integral with an actuating spring in the shape of a spring strip, and the counter-shutter, similarly molded integral both with its return spring strip and with an extension adapted to be used as a releasing key, the two spring strips mentioned hereinabove being secured to the shutter and the counter-shutter, respectively, at locations opposite the respective pivots of the latter.

According to a particular embodiment of the invention, enabling the shutter to be thus constituted by two members only, the shutter proper is provided with an elongated slot, inside which an offset finger carried by the counter-shutter is adapted to move, in a manner such that the release is obtained by pulling the shutter until the latter is disengaged from a stationary retaining stop, while the return to the cocked position causes the shutter, owing to the action of the above-mentioned elongated slot, to move back until it is locked again behind said stationary stop.

The invention covers also other features, to wit:

The spring strip of the shutter proper ensures both the driving of the latter, at the release time, and the reset thereof on its return;

The counter-shutter is provided with a finger which urges the shutter proper when the latter is disengaged from its stationary stop;

The counter-shutter includes a boss, which constitutes both a spacer ensuring the free motion of the shutter proper, and returning means for the latter at the time of reset;

The counter-shutter includes a semi-circular cheek disposed round the pivot pin on which said counter-shutter is pivoted on the camera case, said cheek constituting a baffle and preventing any light from entering said case;

The edge of said semi-circular cheek of the counter-shutter is used for ensuring the tensioning of the spring strip of the shutter proper.

Furthermore, according to a modified embodiment of the invention, said shutter includes, with a view to taking photographs with flash, two metal strips ensuring the synchronization of the release of the flash with the opening of the lens.

The invention will now be described in further detail, with reference to the appended diagrammatic drawing, which illustrates, by way of non-limiting example, an embodiment of the shutter of the invention. In said drawing.

According to the invention, the shutter assembly of a camera of the type referred to hereinabove is constituted by two parts only, which are wholly made of plastic material, to wit: a shutter proper 2, and a counter-shutter 3.

Figure 3:
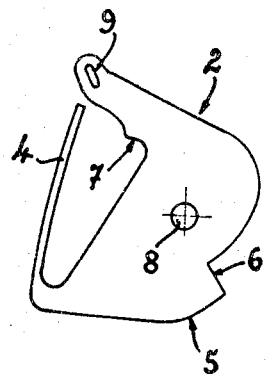
FIG. 3 is a top plan view of the shutter proper.

The shutter 2, as shown in FIG. 3, is integral with an actuating spring 4, which is constituted by an elastic strip or blade. Said shutter includes two guiding sections, to wit, an outer guiding section 5 prolonging a catch 6, and an inner guiding section 7. The shutter is provided with a circular hole 8 in its middle, and with an elongated slot 9 at its end opposite to said catch 6.

Figure 1:
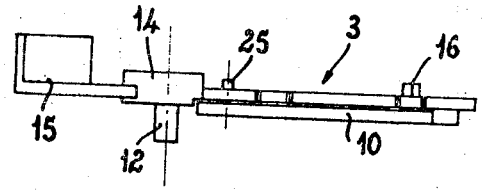
FIGS. 1 and 2 are respectively a side elevation and a top plan view of the counter-shutter.
Figure 2:
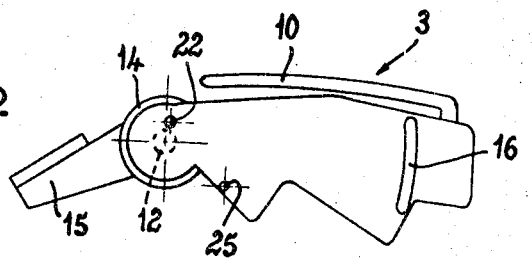

The counter-shutter 3, which is shown in detail in FIGS. 1 and 2, is likewise integral with its return spring, the latter being constituted by a strip 10 disposed under the upper surface thereof. Said counter-shutter 3 includes a pivot pin 12 adapted to fit in a bore provided in a case 13, so as to make said counter-shutter pivotable, while a semi-circular cheek 14 around said pivot pin 12 constitutes a baffle and prevents the light from entering said case 13.

Said counter-shutter 3 extends beyond said cheek 14 in the bent extension portion 15, which constitutes a release key. The other end of said counter-shutter is provided with an arc-shaped boss 16, against which the catch 6 on the shutter 2 comes to rest, when said shutter 2 is in its cocked position, as shown in FIG. 4, said boss 16 acting at the same time as a spacer enabling the shutter 2 to move freely.

Figure 4:
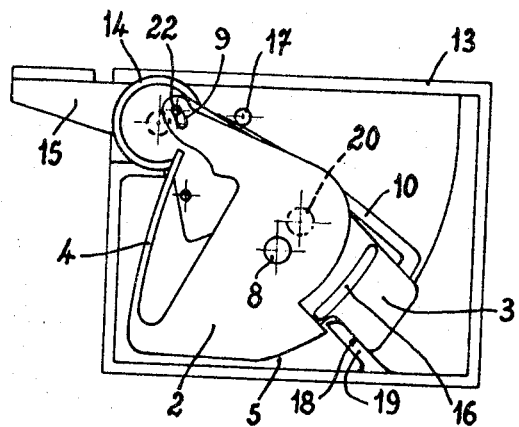
FIGS. 4, 5, 6, 7 are top plan views illustrating the operating principle of the shutter of the invention.

When the counter-shutter 3 is mounted in the case 13, the spring strip 10 is slightly sprung by a stop 17 provided in said case 13, and bearing on the free end of said strip, in a manner such that the free end 18 of said counter-shutter 3 bears against a second stop 19 integral with the case 13, and closes thus the hole 20, which opens into the camera body, and is shown in dotted lines in FIG. 4.

The shutter 2 is pivoted, by means of its elongated slot 9, on a pivot pin 22 provided on the upper surface of the counter-shutter 3, which pivot pin is purposely offset with respect to the pivot pin 12 of said counter-shutter, and the free end of the spring strip 4 of said shutter 2 is disposed in a manner such that it is slightly sprung by coming in contact against the corresponding end of the cheek 14 of the counter-shutter 3. The movement of the shutter 2 depends thus only on that of the counter-shutter 3.

Figure 5:
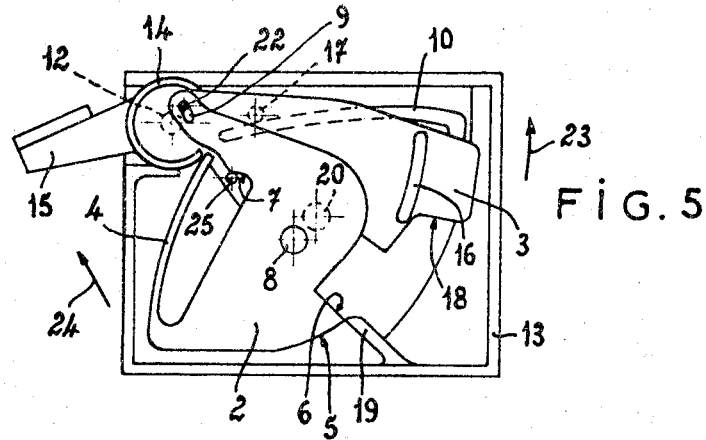

As a matter of fact, as soon as the operator presses on the release key 15, the counter-shutter 3 is caused to pivot in the direction of the arrow 23 of FIG. 5, so that the catch 6 on the shutter 2, which was bearing against the boss 16 on said counter-shutter 3, comes to bear against the stop 19 on the case 13, under the action of its actuating spring strip 4, which is deformed by the shifting of the end of the cheek 14.

Simultaneously, owing to the fact that the pivot pin 22 is offset with respect to the pivot pin 12, the shutter 2 is subjected to a translatory motion in the direction of the arrow 24 of FIG. 5, which motion tends to free the notch 6 on said shutter from the stop 19 on the case 13.

Figure 6:
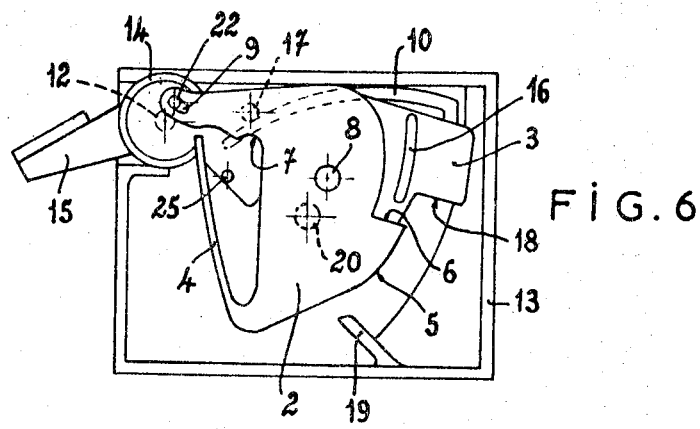

Advantageously, just before said notch 6 frees itself from said stop 19, a finger 25 secured to the countershutter 3, comes to bear against the guiding section 7 of the shutter 2, so that the latter is pushed forcibly and, under the action of its spring strip 4, pivots round the pivot pin 22, so as to come into the position shown in FIG. 6.

During said rotation of the shutter 2, the circular hole 8 in the latter passes in front of the corresponding hole 20 in the case 13, and enables the film disposed in the camera body to be exposed.

Figure 7:
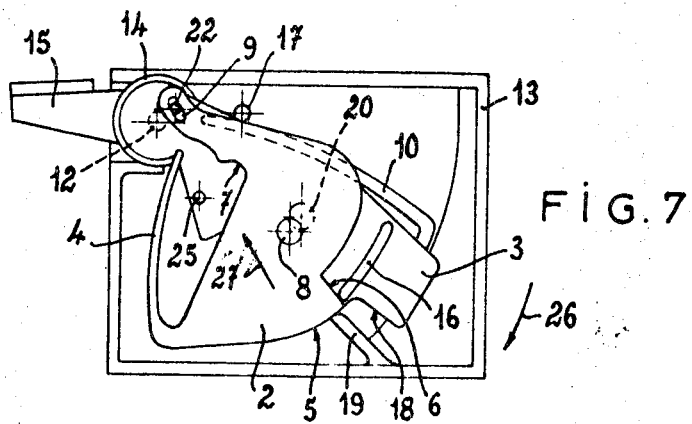

As soon as the operator stops pressing on the key 15, the spring strip 10, deformed by the previous movement, is released and causes the counter-shutter 3 to pivot in reverse direction, that is, the direction of the arrow 26 of FIG. 7, until the end 18 of said counter-shutter abuts again against the stop 19 on the case 13. The shutter 2, being carried along by the boss 16 on the countershutter 3, pivots round the pivot pin 12, and then, as its outer guiding section 5 engages the end of the stop 19, moves back in the direction of the arrow 27 of FIG. 7, until its catch 6 reaches a position behind said stop 19 under the action of the residual tension of the spring strip 4, whereby said shutter 2 is brought back to its initial cocked position, as shown in FIG. 4.

According to the provisions of the patent statutes, I have explained the principle of my invention and have described what I now consider to be its best embodiment. However, I desire to have it understood that, within the scope of the appended claims, the invention may be practiced otherwise than as specifically described.

What I claim is:

1. A shutter assembly for a camera, said assembly comprising: a shutter constituted of injection molded plastic material having an aperture for the passage of light and including a resilient blade, a countershutter which is also constituted of injection molded plastic material and includes a resilient blade, a casing for said shutter and countershutter, said countershutter including a shaft pivotably supported in said casing, an extension projecting outside the casing and constituting a release key and a finger eccentric relatively to said shaft, said release key being intergal with said shaft, said shutter having an elongated opening in which said finger is loosely received, said casing including a fixed abutment, said shutter having a notched surface which is held against said abutment by said pin acting on the shutter causing tensioning of the blade thereof so that when the countershutter is actuated by pressing said release key, the shutter is freed by the engagement of the pin in the slot to release the notched surface of the shutter from said fixed abutment and enable the shutter to move under the action of its tensioned blade to open and close an aperture in the casing by passage therepast of the aperture in the shutter.

2. An assembly as claimed in claim 1 wherein the shutter is provided with a ramp engageable with said abutment for causing recocking of the shutter beyond the fixed abutment.

3. An assembly as claimed in claim 1 wherein said countershutter comprises a further finger for engaging and pushing the shutter at the moment when the notch surface is released from the fixed abutment.

4. An assembly as claimed in claim 1 wherein the countershutter comprises a boss for engaging the notch surface of the shutter to return the shutter into its position in which the notch surface engages the abutment.

5. An assembly as claimed in claim 1 wherein the countershutter comprises a semi-circular cheek surrounding said shaft for engaging and deforming the blade on the shutter while preventing admission of light into the casing.

References Cited

UNITED STATES PATENTS

| 2,047,263 | 7/1936 | Green | 95—60 |
|---|---|---|---|
| 2,161,338 | 6/1939 | Crumrine | 95—60 |
| 2,186,639 | 1/1940 | Hutchison | 95—60 |
| 2,537,885 | 1/1951 | Fox | 95—60 |
| 2,940,374 | 6/1960 | Fuerst | 95—60 |

NORTON ANSHER, Primary Examiner

L. H. McCORMICK, Jr., Assistant Examiner